July 30, 1957     K. C. HOBBS     2,801,241
PROCESS FOR THE PRODUCTION OF STARCH ETHERS
Filed July 2, 1953
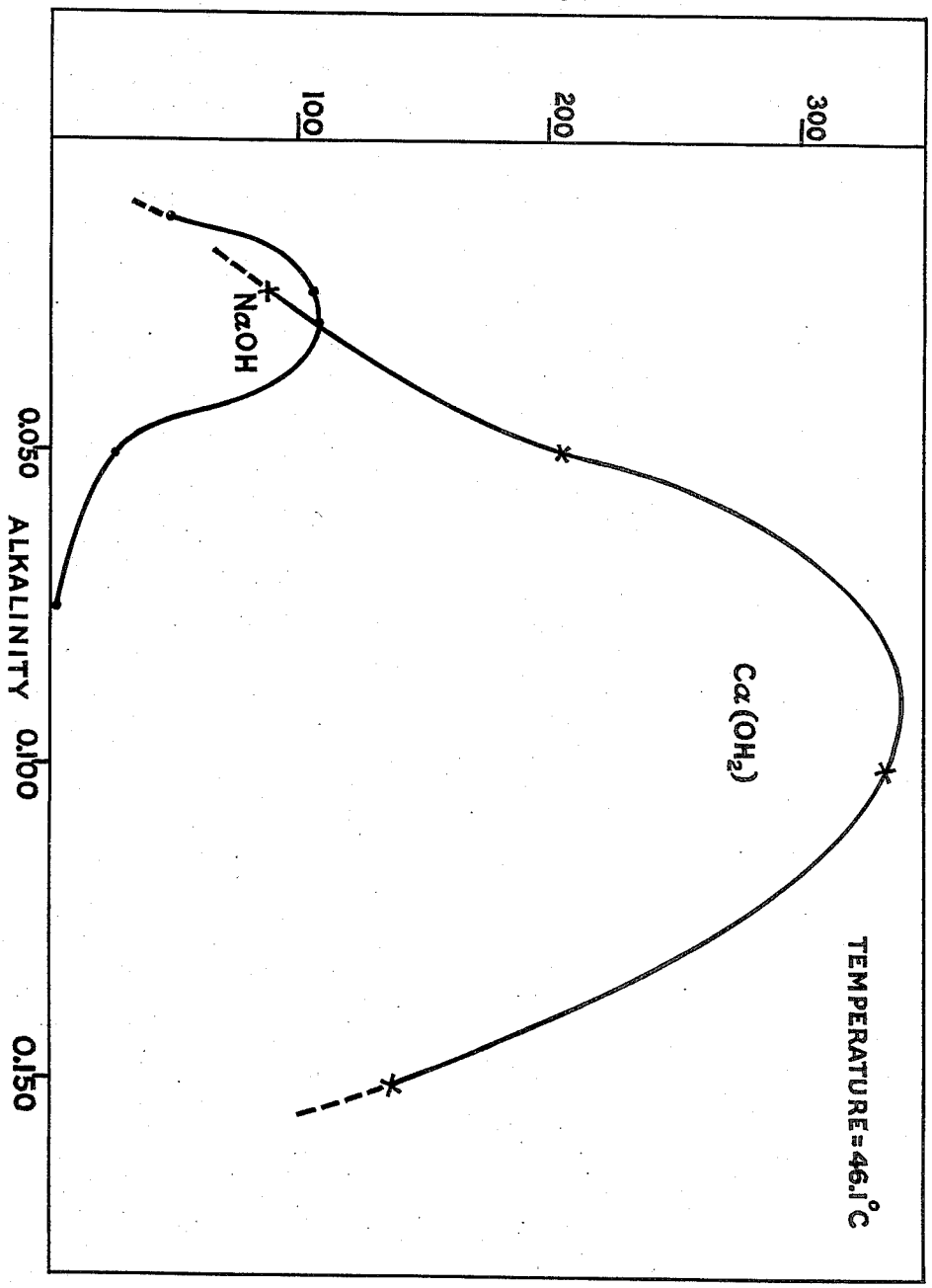
Inventor
KENNETH C. HOBBS
by Mildred Oncken
Attorney

United States Patent Office 2,801,241
Patented July 30, 1957

2,801,241

PROCESS FOR THE PRODUCTION OF STARCH ETHERS

Kenneth C. Hobbs, Chicago, Ill., assignor to Corn Products Refining Company, New York, N. Y., a corporation of New Jersey Application July 2, 1953, Serial No. 365,691

8 Claims. (Cl. 260—233.3)

This invention relates to an improved method for the production of starch ethers.

Numerous methods for preparing starch ethers have been proposed in the past, employing many types of etherifying agents, a variety of catalysts and a great diversity of conditions. It is quite probable that several hundred patents relating to this art have already been granted and publications in scientific journals and books are just as numerous. However, in spite of all that is known about starch ethers, they are not produced commercially to an great extent, except in a few instances.

This principal problem in the commercial production of starch ethers has been to reduce the cost of producing them to a level where they can compete with other starch products having less desirable properties for a particular application but being less costly in price.

Factors to be considered in producing starch ethers include costs of etherifying agent and catalyst, efficiency of the reaction, length of time of the reaction, and ease of purification. That the etherification processes of the prior art have been uneconomical will be apparent from the discussion now to follow.

In early methods of producing starch ethers, starch was dispersed in aqueous alkali metal hydroxide of relatively high concentration and an etherifying agent such as dimethyl sulfate, in excess, was added. After the reaction was carried out to the desired extent, acid was added to the resultant solution of starch ether to neutralize the alkali metal hydroxide. This method is highly inefficient. Large quantities of etherifying agent were required to attain a given degree of substitution (i. e. number of substituent ether groups per anhydroglucose unit, abbreviated as D. S.) because a larger proportion of the reagent reacts in the presence of water and alkali to form undesirable by-products, e. g., alcohols and glycols. In addition, the neutralization produces a large quantity of salt. In the case of soluble starch ethers, the crude solution of the starch ether is of little commercial importance. Salt adversely affects the colloidal properties of the starch ether itself, such as clarity, stability and viscosity characteristics, and for most uses can be tolerated only in small quantities, if at all. The cost of removing large quantities of soluble salts from aqueous solutions of starch ethers is prohibitive as is the cost of transporting solutions of starch ethers, should this be desired.

Modifications of the above method have usually limited the amount of alkali metal hydroxide as catalyst to about 1.0 mole of catalyst to one molar weight of starch (162 grams). Thus starch may be treated in the absence of added water by stirring it into a strong solution of sodium hydroxide to form an alkali starch complex. Or the starch in alcoholic suspension containing sodium hydroxide may be heated to form a complex. The complex is then reacted with the etherifying agent. However, even here when the sodium hydroxide is neutralized there is formed about 5 percent of salt and this amount is prohibitive for most uses. Washing these products to remove salts is not satisfactory because the starch granules have been so altered that they have swollen and have become slimy and filtration is difficult, if not impossible. Furthermore, where alcohol is used, although it helps to prevent swelling, there is a problem in recovering it from the reaction mixture.

More recently it has been proposed to overcome some of these defects by limiting the amount of alkaline catalyst to trace amounts when epoxyalkanes are used as etherifying agents so as to prevent gelatinization of the starch. However, in the latter case, it is obvious that the added salt still must be removed, thus adding to the cost of preparing the starch ether. Moreover, the use of the small amounts of catalysts proposed does not permit efficient etherification of the starch and although gelatinization is avoided, a large proportion of the etherifying agent is not efficiently used in that inordinately high proportion of the etherifying agent reacts to form undesirable by-products, such as alkylene glycols.

It is an object of the present invention to provide an improved processed for the preparation of starch ethers. Another object is to provide a process for making starch ethers in substantially pure form. A further object is to provide a process for producing starch ethers wherein a high degree of efficiency of etherification is attained, i. e., a relatively large proportion of etherifying agent, such as epoxyalkanes, will react with the starch molecule under the conditions employed rather than reacting with water to open the epoxide ring and form an alkylene glycol. Still another object is to provide a continuous process for making starch ethers with epoxyalkanes as etherifying agents. Yet another object is to provide a process for making a starch ether which will not become sticky or slimy and which may be washed and filtered readily.

I have discovered that if specific amounts of calcium hydroxide are used as catalyst in the etherification of starch, and the reaction is carried out at a temperature not exceeding about 45° C. to 50° C., the moisture content of the starch being at least about 12 percent, I can overcome prior art difficulties. Thus, when my process is used in the etherification of starch, and particularly when epoxyalkanes are used as etherifying agents, I have found that the degree of efficiency is unexpectedly increased, the side reactions are minimized, the degree of substitution with a given amount of etherifying agent is increased. In other words, I have discovered that a sufficiently high alkalinity to promote rapid etherification without gelatinizing the starch can be obtained with calcium hydroxide, and that etherification efficiency is substantially improved under these conditions over that in reactions using sodium hydroxide, even when the latter is present in amounts that cause swelling or gelatinization of the starch to the point where filtration and purification is impossible. The amount of calcium hydroxide which produces my unexpected results is that which produces an alkalinity within the range of 0.05 to 0.15. By the term "alkalinity" I mean the number of moles of hydrochloric acid required to adjust the pH of an alkaline slurry containing 162 g. of starch, to 5.5. The specified amount of catalyst used within the temperature and moisture ranges aforementioned permits the starch granules to become swollen or distended to the point where etherification takes place more readily than heretofore but not to the point where they become slimy or sticky, thus avoiding the difficulties of filtration inherent in prior art methods.

I have discovered, contrary to the teachings of the prior art, that alkaline compounds are not equivalent catalysts in the etherification of starch and, in particular, that calcium hydroxide is unexpectedly superior to sodium hydroxide, the preferred catalyst of the prior art. I have discovered that calcium hydroxide, in amounts hereinabove specified, has properties not possessed by sodium hydroxide which are distinctly advantageous thereover in catalyzing the formation of starch ethers. For example, I have discovered that when quantities of calcium hydroxide and sodium hydroxide, giving the same alkalinity within the range hereinabove specified, are used as catalysts in the etherification of starch, with the same amount of etherifying agent, the degree of efficiency of etherification is unexpectedly greater for calcium hydroxide than for sodium hydroxide. When all factors involved in the etherification are kept constant except that varying amounts of etherifying agents are used, it is possible to obtain products with decidedly higher D. S. with calcium hydroxide than with sodium hydroxide. The maximum D. S. attainable without gelatinization of the starch is markedly higher with calcium hydroxide than with sodium hydroxide, at the same alkalinities. When the alkalinities are the same, starch gelatinizes much sooner with sodium hydroxide than with calcium hydroxide. At a given alkalinity and temperature starch will gelatinize at a lower D. S. level with sodium hydroxide as catalyst than with calcium hydroxide. As already mentioned, the amount of side reaction products is less when calcium hydroxide is used than when sodium hydroxide is used. Thus when ethylene oxide is used as the etherifying agent, ethylene glycol is formed as a by-product and the amount is considerably less with calcium hydroxide than with sodium hydroxide.

One of the important features of my invention is the ease with which slurries of starch ethers, as produced by my invention may be filtered. As is well known in the art, starch slurries wherein the starch granules have become sticky or slimy or gelatinized, cannot be filtered. Prior art processes of making starch ethers are decidedly limited in this respect.

My process not only provides a product which is easily filtered, but the overall time involved, also an important feature in producing it, is significantly reduced over prior art methods. Each of the foregoing advantages will be more apparent from data presented hereinafter.

In carrying out the invention, starch (raw or modified, but ungelatinized) either air dried or, preferably, in aqueous slurry is mixed with the required amount of calcium hydroxide and then the etherifying agent added, although the reactants may be mixed in any order. When etherifying agents, such as alkylene oxides, are used, it is preferable to mix the starch and catalyst and then add the etherifying agent. The temperature should, of course, not exceed that specified.

The invention is applicable to any type of raw starch, such as corn, wheat, grain sorghum, tapioca, rice and the like, and any modification thereof wherein the resultant modified starch has not been gelatinized. For example, so-called thin boiling starches made from any of the aforementioned raw starches may be etherified in accordance with the principles of my invention.

Before describing the examples, the methods used in evaluating certain of the results obtained will first be described.

RELATIVE FILTRATION RATE

For determination of filtration rates, a sintered glass Buchner funnel of medium porosity and having an effective filtering area of 50 sq. cm. is cleaned, washed with concentrated hydrochloric acid and then with water. The funnel is placed on a 250 ml. filtering flask which is connected to a 4000 ml. filtering flask by means of a three-way stopcock (bore=3 mm.) attached between the tubulations. The larger flask is fitted with a stopper through which one arm of a three-way stopcock is inserted. A vacuum line and line leading to an open end manometer are connected to the other arms of this stopcock. With the connection between the two filtering flasks closed, the pressure in the 4-liter flask is reduced to 562 mm. Hg below atmospheric pressure, then the vacuum line is closed, 250 ml. of distilled water is added to the funnel, the stopcock between the flasks is opened and the time required for this quantity of water to pass through the filter is measured. When the filter is clean and satisfactory for use, 0.16 minute (±0.01) is required. By using silicone grease on all connections, the pressure in the flasks during filtration can be reproduced consistently within the range of 510 to 515 mm. Hg below atmospheric pressure without additional adjustments. After the filtration rate of water is checked, a slurry containing 162 g. of starch is added to the funnel and filtered under the conditions described above. The instant the last trace of water disappears from the surface of the cake, filtration is stopped. After transferring the filtrate to a one liter volumetric flask, 250 ml. of water is added to the funnel and the time required for this amount of wash water to disappear from the surface of the cake under the conditions employed with water alone is measured. Relative filtration rate is expressed in terms of ml. of water which will flow through the cake per minute under these standardized conditions. With unswollen starch, the cake thickness is always about 3.4 cm.

D. S.

D. S. values were determined in accordance with the procedure described by P. W. Morgan in Ind. Eng. Chem., anal. Ed., 24, 500 (1946) in an article entitled "Determination of ethers and esters of ethylene glycol."

GLYCOL

Glycol (either ethylene or propylene) was determined in filtrates from the hydroxyalkylation procedures by adjusting a suitable aliquot to 100 ml. and adding 10 ml. of a periodate solution which was 0.2 N in respect to periodic acid. The reaction mixture was held in a stoppered flask for exactly 2 hours at 28° C. after which excess periodate was determined by titration with standard arsenite solution. Correction of results was made for periodate consumed by soluble starch, if any, in these process liquors. Soluble starch was determined by an independent method.

The following examples, which are intended as informative and typical only and not in a limiting sense, will further illustrate my invention:

Example I

This example shows the advantages of using calcium hydroxide at comparable alkalinities over sodium hydroxide, the preferred catalyst of the prior art, in the etherification of starch.

A series of slurries of 181 g. of grain sorghum starch (containing 10.5 percent of moisture) in 200 ml. of water were made to which varying amounts of calcium hydroxide in 30 ml. of water were added sufficient to provide alkalinities listed in Table I below. The temperature of the slurries was 46.1° C.

A similar series of slurries was made in which sodium hydroxide was used in place of calcium hydroxide. For preparation of the slurry having an alkalinity of 0.05 the starch was slurried in 185 ml. of water and the alkali dissolved in 45 ml. of water was added to the starch slurry in order to prevent partial gelatinization of the starch at this stage. In order to prevent gelatinization in preparing the slurry having an alkalinity of 0.075, the alkali was dissolved in 80 ml. of water and added to the starch slurry and then the slurry was dewatered to the same starch concentration used in the other slurries. This amount of alkali is sufficient to gelatinize the starch if added in concentrated solution which, of course, complicates the process. Hence, it was necessary to dilute the solutions and prepare the reaction mixtures as indicated. Even then the reaction mass gelatinized within a short time.

After the catalyst was added to each slurry, the reaction flask containing the same was closed and the internal pressure was reduced to the vapor pressure of water at 46.1° C. Sufficient ethylene oxide then was added to give a product having a D. S. of 0.052 after 90 percent of the ethylene oxide had reacted, as indicated by a decrease in partial pressure due to ethylene oxide to 10 percent of the original value. Each reaction was terminated by cooling the mixture to 28° C. and adjusting the pH to 5.5. Thereafter, the starch ether was filtered and washed.

The unexpectedly superior results obtained with calcium hydroxide over sodium hydroxide are shown by comparison of the data in Table I.

Even when the temperature was as low as 30° C., sodium hydroxide at 0.075 alkalinity gelatinized the starch.

Example III

This example illustrates etherification of grain sorghum starch with styrene oxide. Styrene oxide in the amount of 12.0 g. was added to a slurry containing 162 g. of grain sorghum starch, 4.02 g. of hydrated lime and 250 ml. of water. After the reaction had proceeded 24 hours at 46° C., the pH of the mixture was adjusted to 5.5, the product filtered, washed, and dried. The reaction

TABLE I

| Catalyst (Kind) | Alkalinity per Glucose Residue | Ethylene Oxide Added (Mole) | Reaction Time (Hrs.)a | Slurry, pH | Relative Filtration Rate (ml./min.)b | Yield Loss (percent) | Product, D. S. | Reaction Efficiency (percent) |
|---|---|---|---|---|---|---|---|---|
| Ca(OH)$_2$ | 0.025 | 0.100 | 26.3 | 11.30 | 36 | | 0.057 | 63 |
| Ca(OH)$_2$ | 0.050 | 0.085 | 13.6 | 11.60 | 42 | 0.21 | 0.052 | 68 |
| Ca(OH)$_2$ | 0.100 | 0.078 | 8.0 | 11.92 | 36 | 0.37 | 0.052 | 74 |
| Ca(OH)$_2$ | 0.150 | 0.072 | 6.0 | 11.98 | 11 | 1.28 | 0.052 | 80 |
| NaOH | 0.0125 | 0.124 | 34.6 | 11.25 | 39 | | 0.051 | 46 |
| NaOH | 0.025 | 0.120 | 16.3 | 11.68 | 34 | 0.27 | 0.054 | 50 |
| NaOH | 0.050 | 0.107 | 7.9 | 11.92 | 4 | 1.62 | 0.052 | 54 |
| NaOH | 0.075 | 0.100 | 4.3 | 11.92 | c 0 | | 0.055 | 61 | a Time required for reaction of 90 percent of the added ethylene oxide.
b Relative filtration rate of original starch was 59 ml. per minute.
c This reaction product gelatinized and was isolated and purified in 80 percent methanol.

The overall advantage of calcium hydroxide over sodium hydroxide is better illustrated in the drawing. In the drawing Factor A, i. e., $$\frac{\text{(Rate of filtration) (reaction efficiency, percent) ml./min.}}{\text{Reaction time (hrs.)}}$$

is plotted against catalyst concentration expressed in terms of alkalinity per anhydroglucose residue. Factor A combines into a single value the three most important factors which determine the efficiency of the process in question and is a relative measure of over-all practicability of the process under a given set of reaction conditions.

Example II

This example shows the superiority of calcium hydroxide as catalyst over sodium hydroxide in the hydroxyethylation of corn starch at a particular D. S. at 30° C. In order to obtain this particular D. S. it was necessary to employ larger amounts of etherifying agents when sodium hydroxide was used as catalyst than when calcium hydroxide was employed.

Slurries were made as described in Example I, except that the temperature was 30° C. Since longer reaction times are required at lower temperatures, particularly with the lower amounts of sodium hydroxide as catalyst, each reaction was discontinued after consumption of 80 percent of added ethylene oxide. The conditions under which the reactions were effected and the results obtained are set forth in Table II.

product formed a paste in hot water which was stable and free flowing even after cooling and standing for four days.

Example IV

In this example glycidyl isopropyl ether was used as the etherifying agent and the procedure was the same as in Example III. The purified product formed a paste in hot water which was viscous but very short and unusually free flowing after cooling and standing for four days.

Example V

To a slurry of 162 g. of grain sorghum starch in 230 ml. of water was added sufficient calcium hydroxide (0.05 mole) to give the starch an alkalinity of 0.1. Then 0.10 mole of propylene oxide was added and the etherification carried out as in Example I. The time of the reaction was 24 hours and the temperature 50° C. The hydroxypropyl starch had a D. S. of 0.046.

Example VI

In this example starch in semi-dry state was hydroxyethylated using lime as catalyst. Lime was added to corn starch in the molar ratios and at starch moisture levels shown in Table III below. The mixtures were held in a closed chamber from which air was excluded and then 0.1 mole ethylene oxide vapors were allowed to distill into the chamber. The chamber was closed and the reaction between starch and ethylene oxide was allowed to proceed at temperatures and for periods of time indicated in the table. At the end of the reaction period the pH

TABLE II

| Catalyst (Kind) | Alkalinity per Anhydroglucose Residue | Ethylene Oxide Added (Mole) | Reaction Time, Hoursa | Slurry, pH | Relative Filt. Rate (ml./min.) | Yield Loss (percent) | Product, D. S. | Reaction Efficiency (percent) | Factor Ab $\frac{F \times E}{T}$ |
|---|---|---|---|---|---|---|---|---|---|
| Ca(OH)$_2$ | 0.025 | 0.118 | 72.0 | 11.30 | 25.7 | 0.18 | 0.065 | 68.5 | 24 |
| Ca(OH)$_2$ | 0.050 | 0.103 | 40.0 | 11.60 | 27.8 | 0.18 | 0.061 | 74.0 | 51 |
| Ca(OH)$_2$ | 0.100 | 0.099 | 22.0 | 11.90 | 28.4 | 0.20 | 0.064 | 80.8 | 104 |
| Ca(OH)$_2$ | 0.175 | 0.092 | 17.0 | 11.98 | 16.6 | 0.48 | 0.062 | 83.3 | 81 |
| NaOH | 0.0125 | 0.178 | 103.5 | 11.30 | 21.9 | 0.20 | 0.073 | 51.8 | 11 |
| NaOH | 0.025 | 0.151 | 53.7 | 11.70 | 21.1 | 0.23 | 0.063 | 52.1 | 20 |
| NaOH | 0.050 | 0.134 | 22.0 | 11.90 | 23.9 | 0.03 | 0.062 | 57.3 | 62 |
| NaOH | 0.075 | 0.135 | 14.0 | 11.90 | 0.1 | (Gelatinized, not isolated) | | | c 0.5 | a Time required for reaction of 80 percent of the added oxide.
b F=relative filtration rate; E=reaction efficiency; T=reaction time.
c E=estimated to be 63 percent.

of the mass was adjusted to 6.0, the starch ether was thoroughly washed and dried in order to determine the D. S. of the same and the amount of ethylene oxide which had reacted to form the by-product ethylene glycol.

TABLE III

| Moles CaO Per Molar Wt. Starch | Starch Moisture, percent | Reaction Temp., °C. | Reaction Time, Hrs. | Glycol Formed, Moles | D. S. of Starch Ether |
|---|---|---|---|---|---|
| 0.05 | 15 | 35 | 20 | 0.014 | 0.073 |
| 0.05 | 20 | 35 | 8 | 0.010 | 0.078 |
| 0.05 | 20 | 35 | 5 | 0.009 | 0.073 |
| 0.05 | 20 | 40 | 5 | 0.003 | 0.081 |

Sodium hydroxide (dry form) of equal alkalinity cannot be mixed satisfactorily with semi-dry starch in the manner described above since there will be localized gelatinization of the starch wherever sodium hydroxide particles come in contact with the starch, the adverse effects of which are over-derivitization of some parts of the starch mass and the formation of undesirable lumps. If the moisture content of the starch is low, e. g. below about 12 percent, it is possible to mix dry sodium hydroxide into the starch without localized gelatinization, but 4 to 5 days are required for even distribution.

I claim:
1. The process of preparing starch ethers which comprises reacting starch with a compound selected from the group consisting of lower aliphatic alkylene oxides, styrene oxide and glycidyl isopropyl ether, in contact with calcium hydroxide at a temperature not exceeding about 45° to about 50° C., for a sufficient period of time to produce the desired degree of etherification but insufficient to gelatinize the starch and neutralizing said calcium hydroxide; the amount of calcium hydroxide being sufficient to give an alkalinity to the starch of 0.05 to 0.15, the moisture content of the starch being at least about 12 percent during the reaction.

2. The process of claim 1 wherein the starch is corn starch.

3. The process of claim 1 wherein the starch is grain sorghum starch.

4. The process of claim 1 wherein the reaction is terminated after 80 percent to 90 percent of the etherifying agent has been consumed.

5. The process of claim 1 wherein the starch is a modified starch, but not gelatinized.

6. The process of claim 1 wherein said compound is ethylene oxide.

7. The process of claim 1 wherein said compound is propylene oxide.

8. The process of preparing starch ethers which comprises reacting starch with a compound selected from the group consisting of lower aliphatic alkylene oxides, styrene oxide and glycidyl isopropyl ether, in contact with calcium hydroxide at a temperature not exceeding about 45° to about 50° C. for a sufficient period of time to produce the desired degree of etherification but insufficient to gelatinize the starch, and neutralizing said calcium hydroxide, washing and recovering the starch ether; the amount of calcium hydroxide being sufficient to give an alkalinity to the starch of 0.05 to 0.15, the moisture content of the starch being at least about 12 percent during the reaction.

References Cited in the file of this patent
UNITED STATES PATENTS 2,461,139     Caldwell             Feb. 8, 1949
2,516,634     Kesler et al.          July 25, 1950